United States Patent
Pesonen

(10) Patent No.: US 7,130,407 B1
(45) Date of Patent: Oct. 31, 2006

(54) METHOD FOR PROCESSING CALL ESTABLISHMENT REQUESTS

(75) Inventor: Tero Pesonen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/787,516

(22) PCT Filed: Sep. 20, 1999

(86) PCT No.: PCT/FI99/00773

§ 371 (c)(1),
(2), (4) Date: Mar. 19, 2001

(87) PCT Pub. No.: WO00/18091

PCT Pub. Date: Mar. 30, 2000

(30) Foreign Application Priority Data

Sep. 21, 1998 (FI) .................................... 982025

(51) Int. Cl.
*H04M 7/00* (2006.01)
(52) U.S. Cl. ............. 379/221.01; 379/219; 379/220.01
(58) Field of Classification Search ..............
379/220.01–221.03, 221.12
See application file for complete search history.

(56) References Cited

U.S. PATENT DOCUMENTS

| | | | |
|---|---|---|---|
| 5,212,691 A | 5/1993 | Hokari | |
| 5,255,315 A * | 10/1993 | Bushnell | ...................... 379/230 |
| 5,764,744 A | 6/1998 | Mizuma et al. | |
| 5,805,690 A | 9/1998 | Koepper et al. | |
| 6,563,918 B1 * | 5/2003 | Nelson et al. | ............... 379/230 |

FOREIGN PATENT DOCUMENTS

| | | |
|---|---|---|
| EP | 0 740 480 | 10/1996 |
| EP | 0 873 025 | 10/1998 |
| GB | 2 303 995 | 3/1997 |
| WO | WO 97/14255 | 4/1997 |
| WO | WO 98/28923 | 7/1998 |

* cited by examiner

*Primary Examiner*—Ahmad F. Matar
*Assistant Examiner*—Hector Agdeppa
(74) *Attorney, Agent, or Firm*—Pillsbury Winthrop Shaw Pittman LLP

(57) ABSTRACT

The invention relates to a method for processing a call establishment request in a telecommunication system comprising a plurality of exchanges communicating with each other, and in which method: a first exchange receives a call establishment request for establishing a call, data associated with the call establishment request is analysed, and the call is routed on the basis of the analysis. In order to ensure that the call will be optimally routed starting from the first exchange, said analysis comprises the steps of: sending the data associated with the call to be established from the first exchange to a second exchange in response to the result of the analysis performed in the first exchange, performing an analysis in said second exchange based on the data received from the first exchange, sending the data obtained as a result of the analysis performed in the second exchange to the first exchange, and taking into account the data received from the second exchange when establishing the call to be established.

3 Claims, 3 Drawing Sheets

METHOD FOR PROCESSING CALL ESTABLISHMENT REQUESTS

Figure 1:
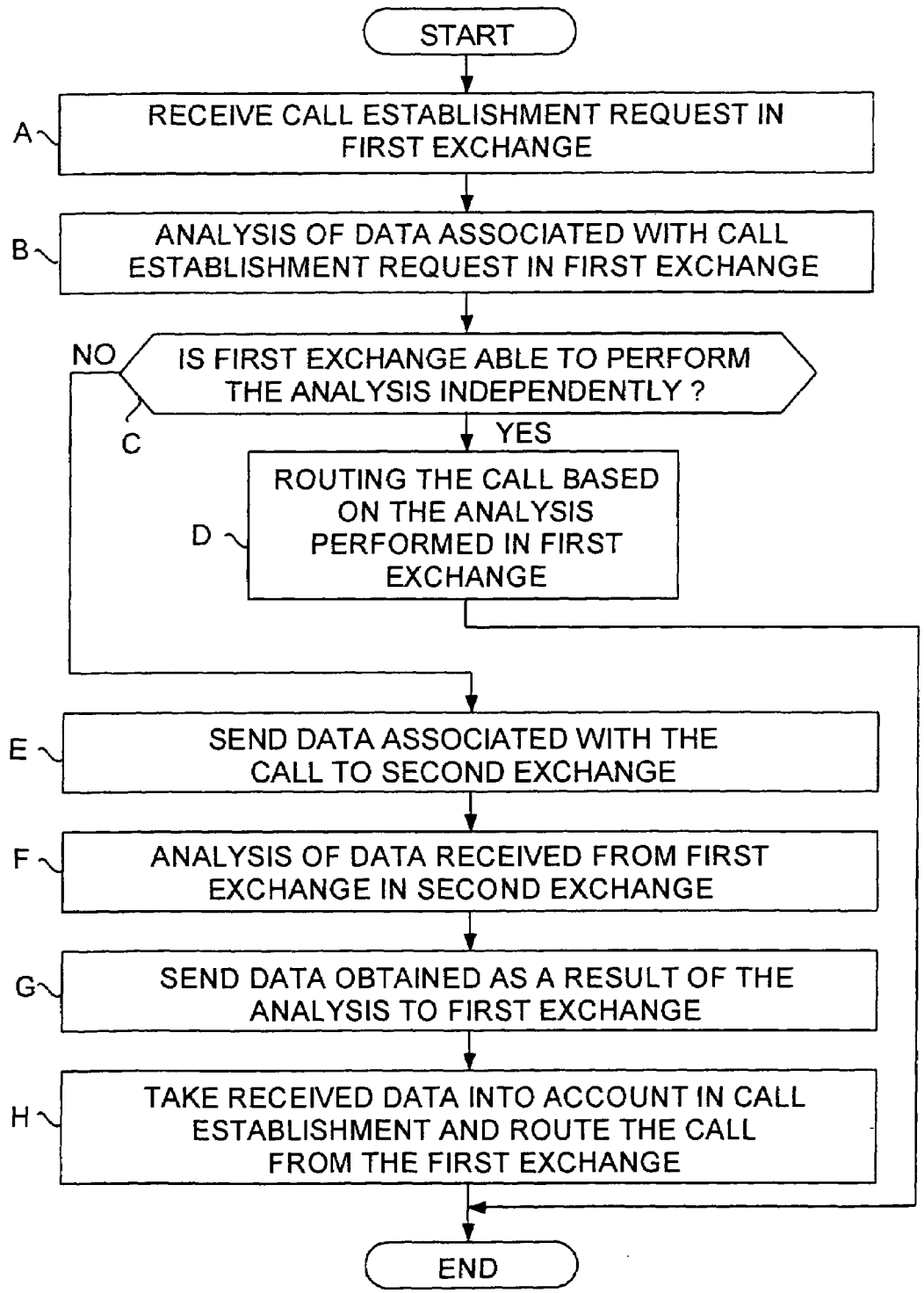

The invention relates to processing call establishment requests and routing calls optimally between different exchanges. Here, the term call refers to any telephone connection that can be established through a telecommunication system, such as a speech call or a data call. The term exchange refers to any network element in a telecommunication system that participates in routing the call, and through which the call may proceed.

A weakness associated with known telecommunication systems is that in order that a first exchange routing a call could be able to utilize the analysing ability and the data in a database of a second exchange when establishing a call it has to route the call to said second exchange for analysis. Then a speech channel that will be utilized by the call to be established is connected between the first and the second exchange. However, routing the call to the second exchange may in practice be an unnecessary intermediate stage. The optimal routing of the call would proceed from the first exchange to a third exchange, and not at all through the second exchange. At worst, the second exchange routes the call back to the third exchange through the first exchange. Then the speech channels of said call proceed from the first exchange to the second exchange, back from the second exchange to the first exchange, and from the first exchange to the third exchange. Such an alternating routing of calls unnecessarily uses the system resources available, and can also degrade the call quality particularly when the call is routed back and forth between telephone network exchanges utilizing different speech coding (for example between a mobile network and a public telephone network), in which case the call has to be coded/decoded several times.

It is an object of the present invention to remove the weakness associated with known telecommunication systems and to provide a solution that allows the exchange routing the call to utilize the analysing ability of another exchange and ensures an optimal routing of the call. This aim is achieved with the method of the invention for processing a call establishment request in a telecommunication system comprising several exchanges communicating with one another, and in which method: a first exchange receives a call establishment request for establishing a call, data associated with the call establishment request is analysed, and the call is routed on the basis of the performed analysis. The method of the invention is characterized by said analysis comprising the steps of: sending data associated with the call to be established from the first exchange to a second exchange in response to the result of the analysis performed in the first exchange, performing an analysis in said second exchange based on the data received from the first exchange, sending data obtained as a result of the analysis performed in the second exchange to the first exchange, and taking into account the data received from the second exchange when establishing the call to be established.

The invention further relates to a telecommunication system in which the method of the invention can be utilized comprising at least a first and a second exchange, and whereof said first exchange comprises: means for receiving a call establishment request of a call to be established, analysing means for analysing data associated with the call to be established, and routing means for routing the call in the telecommunication system. The telecommunication system of the invention is characterized in that said first exchange comprises means for sending the data associated with the call to be established to the second exchange in response to the result of the analysis performed by the analysing means, the second exchange comprises means for receiving the data associated with the call to be established from the first exchange, means for analysing the received data, and means for sending the data obtained as a result of the analysis to the first exchange, and that said first exchange is responsive to the data received from the second exchange for utilizing the received data when establishing the call to be established.

The invention is based on the idea that by allowing signalling between exchanges when establishing a call, a new call to be established can be optimally routed starting from the first exchange, at the same time as the first exchange is offered a chance to utilize the analysing ability of another exchange when establishing the call. By transmitting data associated with the call to be established for analysis in a second exchange and by taking into account the data obtained as a result of said analysis when establishing a call in the first exchange, a solution is obtained where the first exchange is able to process such call establishment requests that include data that it cannot analyse independently.

All data associated with the call establishment request need not be transmitted to the second exchange, instead the first exchange may send to the second exchange only the predetermined data that the second exchange needs for performing the analysis. By enabling signalling between exchanges when routing a call thus allows the analysing ability of other exchanges to be utilized in the exchange routing the call without having to route the call through the exchanges, whose analysing ability is utilized when routing a call. Thus the most significant advantages of the solution of the invention are that the call can be optimally routed starting from the first exchange, that it saves system resources by releasing previously unnecessarily engaged speech channels between exchanges, and that the analysis needed in call establishment can be decentralized between exchanges in a greater extent than before, as all exchanges do not have to be able to analyse all calls, but a particular exchange can transmit certain data associated with the call to be established to another exchange for analysis, and thereafter to receive from said second exchange the data obtained as a result of the analysis that the exchange takes into account when establishing a call.

In a preferred embodiment of the invention, signalling between exchanges takes place through a phantom call. Here, phantom call refers to a call created by any exchange but without an actual subscriber. Then the first exchange that is routing a new call to be established, creates a phantom call to the second exchange, whose analysing ability the first exchange needs for analysing the data associated with the call to be established. In a phantom call the first exchange uses the data obtained in the call establishment request, i.e. the data associated with a new call to be established. Thereafter the second exchange analyses the data associated with the phantom call as if the phantom call were an actual call. Finally the second exchange transmits the data obtained as a result of the analysis to the first exchange by forwarding the phantom call through the first exchange. The first exchange then releases the phantom call and uses the data associated therewith when establishing a new call to be established. The most significant advantage of this embodiment of the invention is that it allows the analysing ability of the second exchange to be utilized in call establishment without having to interfere with signalling between exchanges. No signalling deviating from used standards needs to be created between exchanges for utilizing the invention. For implementing the invention in practice it will suffice that the software of the first exchange is changed in order to allow a phantom call, and that the software of the second exchange will be altered in such a manner that it identifies the phantom call and always routes the phantom call through the exchange, from which the phantom call is transmitted.

In another preferred embodiment of the invention, the first exchange takes into account the data received from the second exchange by routing the call accordingly. In this embodiment of the invention the first exchange observes that it is not able to route the call to be established independently, in which case the first exchange transmits data associated with the call to a second exchange for analysis using a phantom call, for example. The second exchange analyses the data received from the first exchange and based thereon forms the routing data that it sends to the first exchange. The first exchange thus receives the completed routing data, on the basis of which it can directly route the call to be established. This embodiment of the invention renders it possible that all exchanges do not have to be able to route all calls, but it will suffice that the exchange can transmit the data needed to another exchange for routing, whereafter it can receive the completed routing data from said second exchange.

The preferred embodiments of the method and system of the invention are disclosed in claims 1, 2, and 3.

Figure 2:
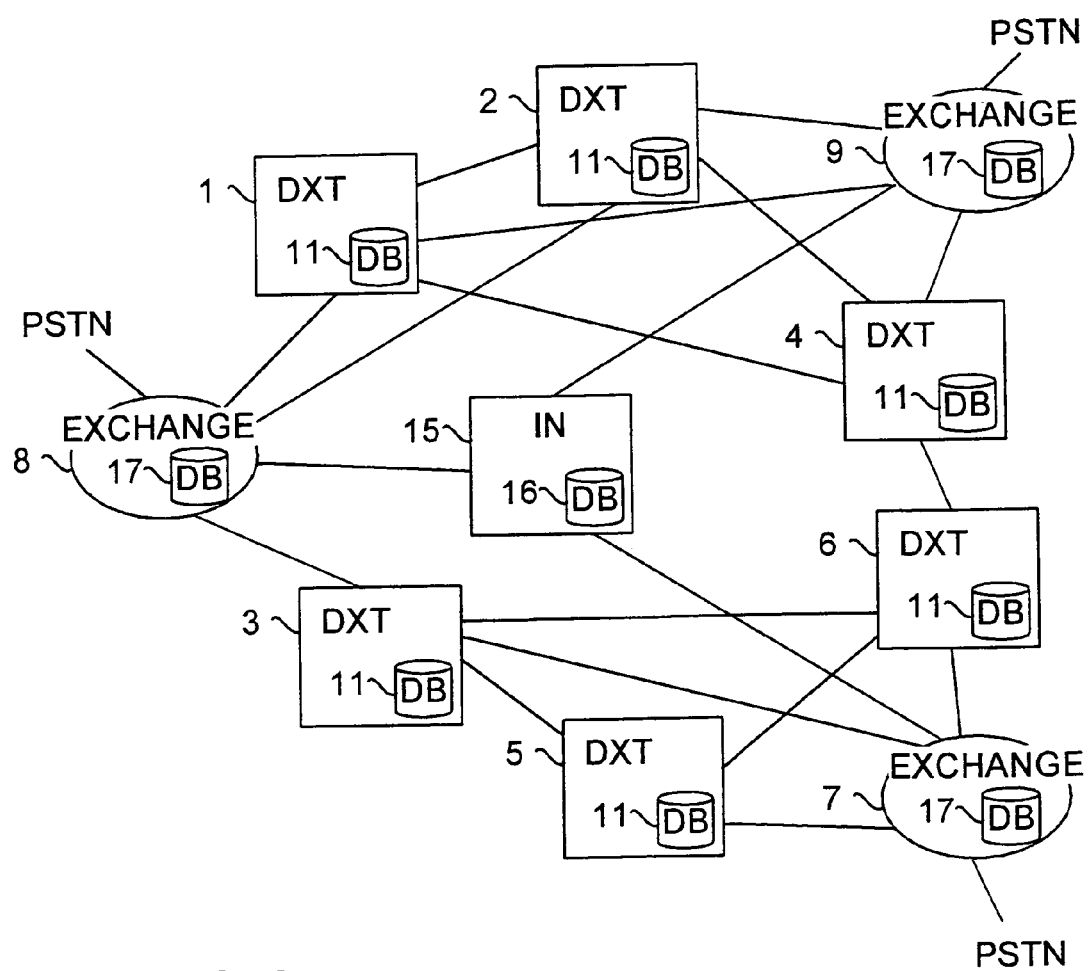
Figure 3:
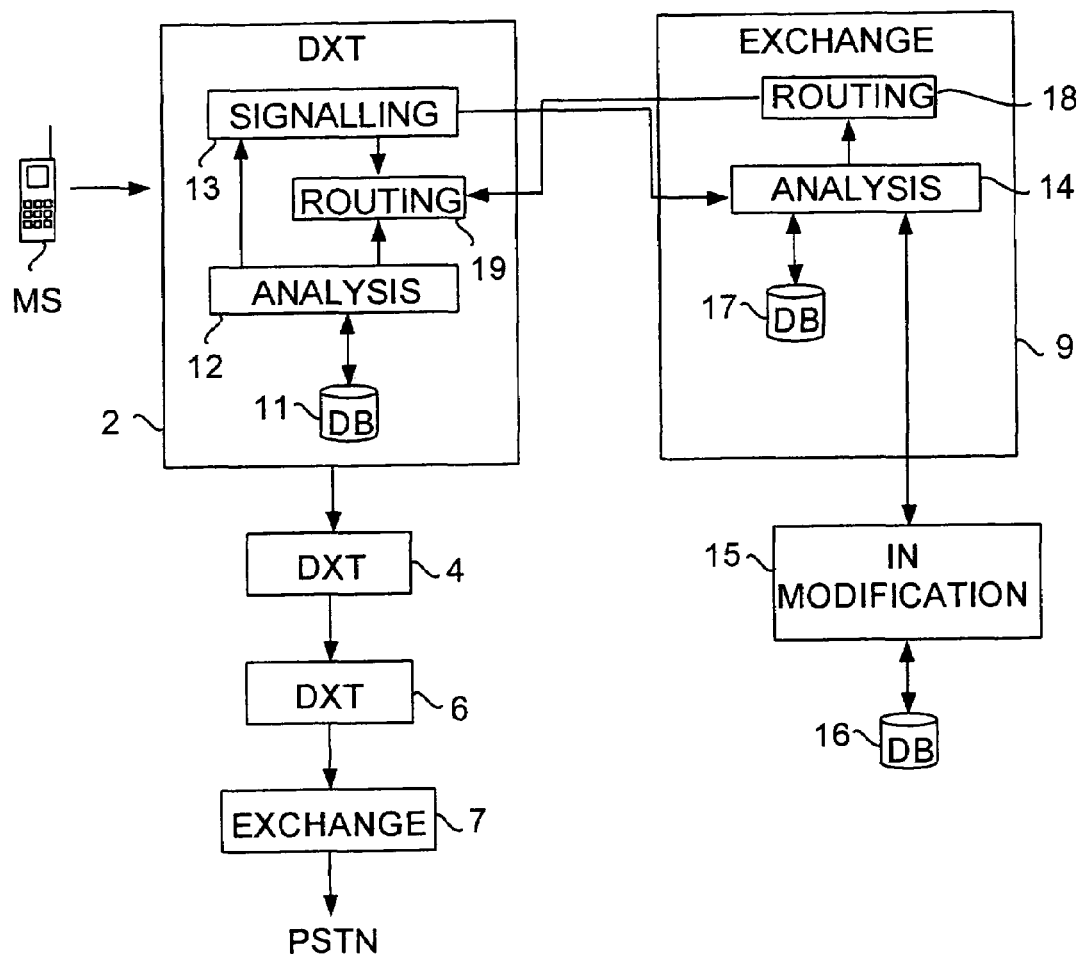

In the following the invention will be described in greater detail by way of example with reference to the attached drawings, in which FIG. 1 is a flow chart showing a first preferred embodiment of the method of the invention, and FIGS. 2 and 3 are block diagrams showing a first preferred embodiment of the system of the invention.

FIG. 1 is a flow chart showing a first preferred embodiment of the method of the invention. The flow chart in FIG. 1 can be utilized in routing a call originating, for example, from a mobile network, such as a TETRA network (Terrestrial Trunked Radio) or the GSM network (Global System for Mobile communication).

In block A the first exchange receives a call establishment request for establishing a new call. In the following the first exchange is by way of example assumed to be a TETRA network exchange.

In block B the TETRA network exchange analyses data associated with a new call to be established for routing the call to be established.

In block C the first exchange checks whether it can independently analyse the data associated with the call to be established.

If the first exchange observes in block C that it can independently analyse the data, then the process proceeds to block D where the first exchange forwards the call on the basis of the performed analysis. An example of such a call, whose data the TETRA network exchange can analyse independently and route optimally is a call between two subscribers in the TETRA network.

If, in turn, the first exchange observes in block C that it cannot analyse the data independently, the process proceeds to block E. The call concerned may be, for example, a call to be made from a mobile station to a public telephone network, in which case the TETRA network exchange observes on the basis of line data included in the call establishment request that the destination network of the call to be established is a public telephone network. The line data consists of information indicating the destination of the call which is being established. Since the first exchange is a TETRA network exchange it does not have enough data available in the example shown in FIG. 1 to be able to independently analyse a call to be made to the public telephone network. In block E the first exchange sends data associated with the call to be established to the second exchange for analysis. If the call in question is a call aimed at a public telephone network, then the second exchange is preferably a public telephone network exchange. All data associated with the call establishment request does not have to be sent to the second exchange, but the first exchange can in a predetermined manner select the data to be sent to the second exchange. The data to be sent to the second exchange includes at least the number of subscriber B, i.e. the number of the connection to which a new call is being established. Furthermore, additional data possibly needed for routing the call can also be transmitted to the second exchange.

Data associated with the call to be established can be sent from the first exchange to the second exchange using a separate signalling message. Another alternative for transmitting said data is that the first exchange transmits the data to the second exchange using a phantom call. Then the first exchange temporarily interrupts the call establishment of the call to be established and creates a phantom call to the second exchange, in which case the first exchange uses the data of the call to be established for creating the phantom call in such a manner that the data can be sent to the second exchange.

In block F the second exchange analyses the data received from the first exchange. This takes place in a way known per se. If a phantom call is created from the first exchange to the second exchange, the second exchange analyses and routes the phantom call as if it were an actual call.

In block G the second exchange sends the data obtained as a result of the analysis to the first exchange. Said data can be sent using particular signalling messages. Alternatively, if a phantom call is established from the first exchange to the second exchange, the second exchange always routes the phantom call through the first exchange, thus conveying the data of the phantom call to the first exchange.

In block H the first exchange receives the data from the second exchange. Thereafter the first exchange continues the call establishment of the call to be established (which was temporarily interrupted in block E) and utilizes the data received from the second exchange when establishing the call to be established. If the first exchange has created a phantom call to the second exchange, it now releases the phantom call, whereafter the first exchange utilizes the data associated with the phantom call when establishing the call to be established.

The decision to be made in block C concerning whether the first exchange can independently analyse the data can be based, for example, on the number of subscriber B in which case the first exchange may observe that the number in question is one that it cannot analyse. Alternatively such data can be associated with the call establishment request that the first exchange cannot analyse, for example line data, indicating that the call should be routed to the public telephone network.

In block H the data received from the second exchange can be taken into account in call establishment in various alternative ways depending on the type and content of the data. When routing data is concerned, the first exchange can, for example, route the call on the basis thereof. Alternatively, the data may indicate whether a call is allowed or not (i.e. checking call rights), in which case the call establishment is either continued or totally interrupted. A further alternative is data that is merely transmitted with the call from one exchange to another when a call is being established. Then said data can, for instance, indicate whether the identifier of subscriber A can be transmitted to subscriber B, i.e. indicate the phone number of the caller.

FIGS. 2 and 3 are block diagrams showing a first preferred embodiment of the system of the invention. FIG. 2 shows exchanges 1–6 of the TETRA network communicating with one another and with exchanges 7–9 of the public telephone network.

Databases are arranged at the TETRA network exchanges 1–6. On the basis of the data stored in the databases the analysing units of the TETRA network exchanges are able to analyse the data associated with the call establishment requests and to route the calls to be established based on the analyses. Databases are also arranged at the public telephone network exchanges, and on the basis of the data stored in the databases the analysing means of the exchanges 7–9 can perform the corresponding analysis, or, for example, the analysis that the routing of the call to be established requires. For practical reasons it is not reasonable that the TETRA network exchanges were able to perform a complete analysis, for example, in order to route a call optimally from a TETRA network mobile station to a fixed network terminal. Such a complete analysis namely requires that the database of the TETRA network exchange comprises the same data that the public telephone network exchanges 7–9. This, in turn, would excessively increase the size of the database. In accordance with the invention it suffices that the TETRA network exchange is able to distinguish between speech cases in which it can independently make a complete analysis and cases in which it cannot completely analyse the data associated with the call to be established.

FIG. 3 illustrates a situation where a TETRA network exchange 2 receives a call establishment request originating from a mobile station MS for establishing a new call to a public telephone network terminal. An analysing unit 12 of the first exchange 2 detects on the basis of line data included in the call establishment request that the destination network of the call is a public telephone network. It is thus assumed by way of example in FIGS. 2 and 3 that line data is transmitted from the mobile station MS through the radio path to the TETRA network indicating that the destination network of the call is a public switched telephone network PSTN. Since a database 11 of the TETRA exchange 2 does not include all necessary information so that the analysing unit 12 could based thereupon route the call optimally to the public telephone network, the first exchange sends in accordance with the invention data associated with the call to a exchange 9 of the public telephone network for analysis.

In contrast to the case shown in FIG. 2 the TETRA network can be provided with a particular exchange that is more intelligent than others and that is able to route calls optimally from the TETRA network to the public telephone network. Other TETRA network exchanges can then be programmed to send data associated with the calls to be established to the more intelligent TETRA network exchange and not to the public telephone network as shown in the case in FIG. 2.

Transmitting data from the first exchange 2 to the second exchange 9 is carried out in FIG. 3 in such a manner that the analysing unit 12 of the first exchange interrupts the establishment of the call to be established, when it observes that it cannot independently analyse the data associated with the call to be established. Thereafter a signalling unit 13 of the first exchange creates a phantom call to the public telephone network exchange 9. In a phantom call the first exchange 2 utilizes the data associated with the call to be established, which means that the phantom call includes at least the number of subscriber B transmitted from the mobile station MS.

The fixed network exchange 9, or the second exchange, processes the phantom call as if it were an actual call. An analysing unit 14 thus detects on the basis of the number of subscriber B that the number concerned is one that should be modified in an IN server 15 (Intelligent Network). The IN server retrieves an actual number corresponding with the selected number of subscriber B from a database 16 thereof and returns said actual number to the analysing unit 14 which processes it from here on as a number of subscriber B. Here, the actual number refers to the number of the connection where the call should be routed.

When the analysing unit 14 has received the actual number, it deduces the routing data of the call on the basis of the data stored in a database 17. At the same time it ensures that said call is allowed (for example that a call can be made from the TETRA network to said number in the public telephone network).

When the routing data of a phantom call is deduced, routing means 18 of the second exchange routes the phantom call back to the first exchange 2. The first exchange releases the phantom call, whereafter it continues to establish a call where it takes the data received from the second exchange into account. Since said data in the example shown in FIG. 2 is formed from the routing data of the phantom call, routing means 19 forward the call to be established on the basis of the routing data of the phantom call.

It is assumed in the examples shown in FIGS. 2 and 3 that a call is forwarded from the exchange 2 through the TETRA network exchanges 4 and 6 to the public telephone network exchange 7, from where the call proceeds to the public switched telephone network PSTN. The call can thus be optimally routed from the first exchange 2 by utilizing the analysing ability of the exchange 9 without having to route the call through said exchange 9.

It is to be understood that the above description and the appended drawings are merely intended to illustrate the present invention. The invention can thus also be applied to other telephone networks than to the exchanges of the TETRA network and the public-telephone network explained above. It is obvious for those skilled in the art that the invention can be varied and modified in various ways without deviating from the scope and the spirit of the invention disclosed in the attached claims.

What is claimed is:

1. A method for processing a call establishment request in a telecommunication system including a plurality of exchanges communicating with one another, the method comprising:

receiving, at a first exchange, a call establishment request for establishing a call;

checking at said first exchange if said first exchange can independently analyse data associated with the call establishment request;

temporarily interrupting the call establishment of the call to be established and creating a phantom call from the first exchange to a second exchange in order to send data associated with said call establishment request from the first exchange to the second exchange if said check indicates that said first exchange can not analyse the data independently;

performing an analysis in the second exchange based on the data received from the first exchange by processing said phantom call as an actual call in order to obtain routing data for said phantom call;

routing said phantom call through said first exchange in order to send said routing data obtained as a result of the analysis performed in the second exchange to the first exchange;

releasing said phantom call in the first exchange when the phantom call is routed back to the first exchange; and continuing the establishment of the call to be established by utilizing the routing data of the phantom call received from the second exchange in said phantom call by the first exchange.

2. The method of claim 1, wherein the first and second exchanges have properties that deviate from one another for analysing data associated with the call establishment request.

3. A telecommunication system comprising a first and a second exchange, wherein:

the first exchange includes means for receiving a call establishment request of a call to be established;

analysing means for analysing data associated with the call;

routing means for routing the call in the telecommunication system;

means for temporarily interrupting the call establishment and for creating a phantom call to the second exchange by using the data associated with said call to be established in response to a result of the analysis performed by the analysing means if said result indicates that the first exchange can not analyse the data independently; and means for releasing the phantom call when the phantom call is routed back to the first exchange, and for utilizing routing data of the phantom call transmitted with the phantom call when establishing the call to be established; and the second exchange includes means for receiving the data associated with the call establishment request from the first exchange in said phantom call;

means for analysing the data associated with the phantom call by processing said phantom call as an actual call in order to obtain routing data for said phantom call; and means for routing the phantom call back to the first exchange in order to send the routing data of the phantom call obtained as a result of the analysis to the first exchange.

* * * * *